United States Patent [19] [11] 4,251,145
Cocron et al. [45] Feb. 17, 1981

[54] FOCUSSING SYSTEM FOR CAMERAS

[75] Inventors: Istvan Cocron; Theodor Huber, both of Munich, Fed. Rep. of Germany

[73] Assignee: AGFA-Gevaert, A.G., Leverkusen, Fed. Rep. of Germany

[21] Appl. No.: 59,207

[22] Filed: Jul. 19, 1979

[30] Foreign Application Priority Data

Jul. 21, 1978 [DE] Fed. Rep. of Germany ....... 2832044

[51] Int. Cl.³ .......................... G03B 3/00; G03B 13/18; G01J 1/42
[52] U.S. Cl. .................................. 354/25; 354/23 D; 354/31; 250/204
[58] Field of Search .............. 354/23 D, 25, 31, 60 A, 354/163, 165; 352/140; 250/201, 204; 353/101; 358/227; 355/56; 350/46; 356/1, 4

[56] References Cited

U.S. PATENT DOCUMENTS

| 3,610,934 | 10/1971 | Turner | 250/201 |
|---|---|---|---|
| 3,652,160 | 3/1972 | Opone et al. | 354/163 X |
| 3,678,835 | 7/1972 | Takishima | 354/25 |
| 3,836,919 | 9/1974 | Matsumoto et al. | 354/25 |
| 3,844,658 | 10/1974 | Gela et al. | 354/163 |
| 3,972,607 | 8/1976 | Reider | 354/23 D X |
| 3,988,747 | 10/1976 | Lermann et al. | 354/25 |
| 4,010,479 | 3/1977 | Nobusawa | 354/25 |
| 4,060,325 | 11/1977 | Nobusawa | 354/25 |

Primary Examiner—Donald A. Griffin
Assistant Examiner—William B. Perkey
Attorney, Agent, or Firm—Michael J. Striker

[57] ABSTRACT

First and second photodetector signals, whose relative amplitudes depend upon focus error, are integrated to form respective first and second integral signals whose relative rates of change are dependent upon focus error. Each integral signal is applied to two comparators, one whose threshold level is reached first and the other having a threshold level which would be reached second. When one or the other of the two integral signals reaches its first-reached threshold level, this applies a corresponding signal to the data input of a respective flip-flop, and when this faster-changing integral signal then reaches its second-reached threshold level this clocks both such flip-flops. The time elapsing between the faster-changing integral signal reaching its first-reached and then its second-reached threshold level constitutes a tolerance interval, during which the slower-changing integral signal is given an opportunity to try to reach its respective first-reached threshold level. If the slower-changing integral signal reaches its first-reached threshold level within the tolerance interval, then a corresponding signal is applied to the data input of its associated flip-flop as well before the two flip-flops are clocked, with the result that the states of the two flip-flops are the same as if both integral signals had indentical rates of change of value.

12 Claims, 2 Drawing Figures

FOCUSSING SYSTEM FOR CAMERAS

CROSS-REFERENCE TO RELATED APPLICATION

The present application discloses a system similar to that of commonly owned copending United States patent application Ser. No. 28,186 filed Apr. 9, 1979 in which we both were coinventors, the disclosure of which is incorporated herein by reference.

BACKGROUND OF THE INVENTION

The present invention relates to a system such as disclosed in the commonly owned application identified above, or more generally to systems having those operating characteristics of such system which will be discussed here. In particular, in systems of the type in question, first and second photosensitive means receive reflected radiation which has been emitted towards a subject and yield first and second photodetector signals which are integrated to yield first and second integral signals. The rate of change of one or the other of the two integral signals is greater, depending upon the polarity or direction of the state-of-focus error. In the system disclosed in the above-identified application, when one or the other of the two integral signals reaches a certain value, this initiates counting by a tolerance-range counter whose counting cycle duration allows an interval of extra time during which the other integral signal can attempt to reach a predetermined value too. If the other signal reaches such value within the extra interval of time, then the state-of-focus error, although non-zero, is of acceptably small magnitude, and output flip-flops, one per photodetector signal, assume states the same as if both integral signals reached such values simultaneously. If within the allotted tolerance-range interval the more slowly changing integral signal does not succeed in reaching its associated threshold level, then the output flip-flops assume states indicating which one of the integral signals has in fact reached such value, this then indicating the polarity of the state-of-focus error.

SUMMARY OF THE INVENTION

The present invention provides a different way of establishing the aforementioned tolerance range of acceptable state-of-focus error, in such a system.

In accordance with the present invention, each of the first and second integral signals is compared against two respective voltage levels, one of which it will reach first and the other of which it will reach subsequently. First and second clocked signal storing stages, e.g., clocked D-flip-flops are provided, one to register whether the first integral signal has reached the first-reached of its respective voltage levels, the other to register whether the second integral signal has reached the first-reached of its two respective voltage levels. When one of the integral signals reaches, additionally, the second-reached of its two respective voltage levels, this effects the clocking of both clocked signal storing stages. Accordingly, the tolerance range of acceptable state-of-focus error corresponds to the time interval which elapses between the more quickly changing integral signal reaching its first-reached threshold value and its second-reached threshold value.

Advantageously, a cycle timer is provided, which establishes the maximum length of time allotted for one or the other or both of the integral signals to reach the second-reached threshold values. If for any reason neither integral signal reaches the respective second-reached threshold value, then the cycle timer effects clocking of the two signal storing stages on its own.

Advantageously, when one of the integral signals effects clocking without the aid of the cycle timer, the latter is automatically reset in response thereto, so as to shorten the duration of the cycle of operation.

The cycle timer is preferably a counter which counts generated pulses. The pulses are preferably derived from the pulsewise operation of the radiation transmitter of the focussing system.

Advantageously, means is provided for limiting and/or regulating the power of the first and second photodetector signals, to minimize the dependence of their amplitudes upon the distance to the subject. This serves to make the rates at which the first and second integral signals change in value less dependent upon mere subject distance and more dependent upon state-of-focus per se. In such event, the difference in the rates at which the first and second integral signals change in value can be more correlated with the error in the subject-distance setting, and be less immune to the mere fact of whether the subject happens to be close or far. This contributes to the extent to which the tolerance range established in the manner described above correlates with a fixed range of acceptable state-of-focus error, i.e., with such range of acceptable error being, to an increased extent, the same for both close and distant subjects.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
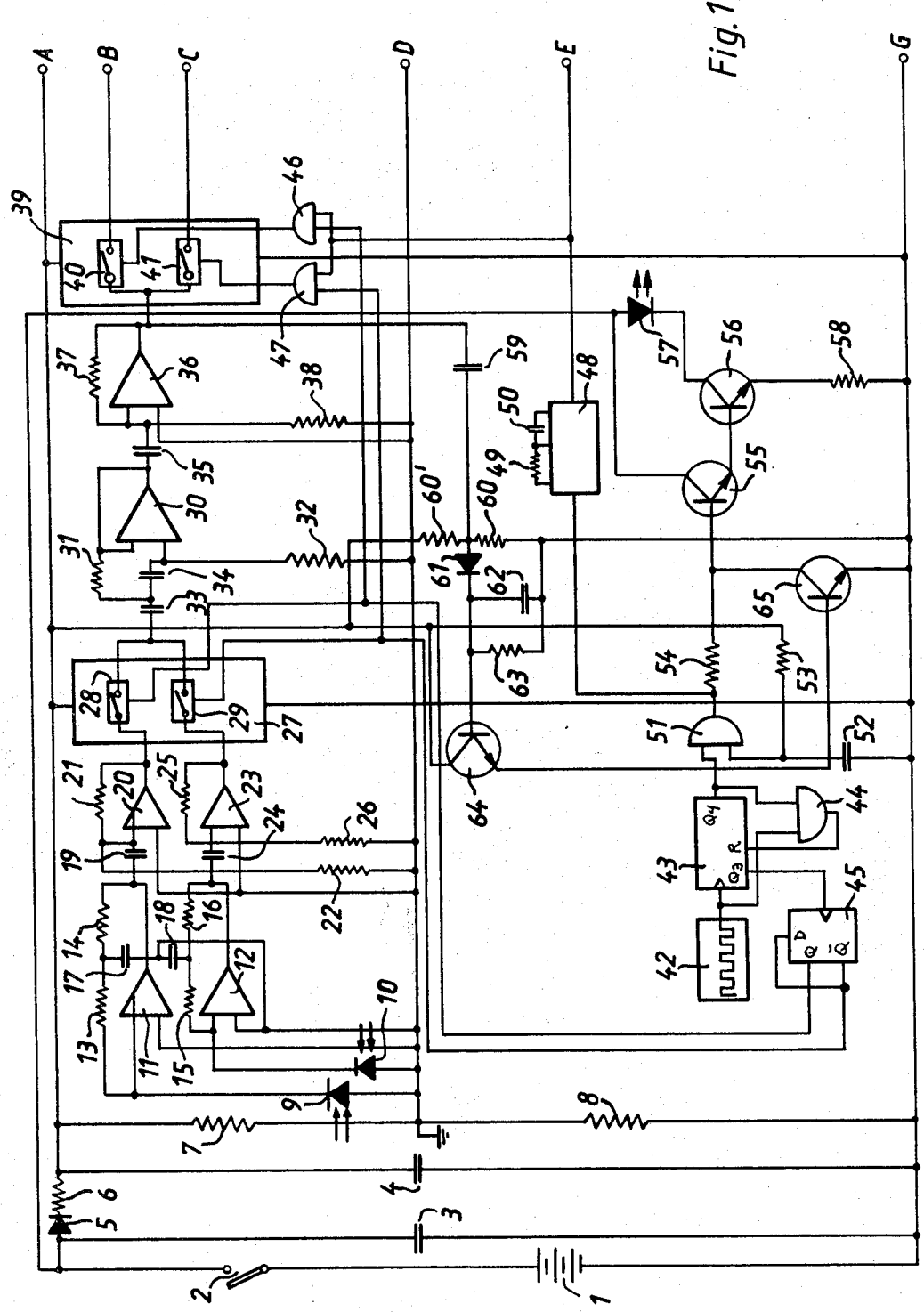
FIGS. 1 and 2 are the left and right halves of a circuit diagram depicting an exemplary and preferred embodiment of the invention.

In FIG. 1, numeral 1 denotes a battery connectable via a power-connect switch 2 to the remainder of the illustrated circuitry. Two capacitors 3, 4, a diode 5 and a resistor 6, together serve to derive from the battery voltage a stabilized operating voltage furnished on line A. Two equal-value resistors 7, 8 connected across the operating voltage establish a midway ground potential for parts of the illustrated circuitry. An infrared-responsive receiver system includes two infrared-responsive diodes 9, 10. In a manner described, for example, in commonly owned copending application Ser. No. 5,091, filed Jan. 22, 1979, now U.S. Pat. No. 4,221,474, the entire disclosure of which is incorporated herein by reference, the two photodiodes 9, 10 are located side by side in the path of an infrared-light beam reflected back towards the camera from a subject towards which an infrared beam is emitted by the camera's focussing system; if the camera's state of focus is correct, the reflected back beam is incident on the two photodiodes equally, if too short then incident more or exclusively on one photodiode, if too long then incident more or exclusively on the other photodiode. Infrared photodiode 9 is connected to the inverting input of an operational amplifier 11, whose non-inverting input is connected to ground. Photodiode 10 is connected to the inverting input of an operational amplifier 12, whose non-inverting input is connected to ground.

The feedback branch of each operational amplifier 11 or 12 comprises two resistors 13, 14 or 15, 16, serving to establish the D. C. signal component gain of the amplifiers. The taps between resistors 13 and 14, and 15 and 16, are connected to ground via respective capacitors 17 and 18. As a result, the A.C. signal component gain of the amplifiers is made frequency-dependent, increasing with increasing frequency. The resistors 13 and 14 are preferably equal in value to resistors 15 and 16; the same applies to the two capacitors 17 and 18.

The illustrated system has two signal transmission paths, the first associated with photodiode 9, the second with photodiode 10. The first signal transmission path comprises a coupling capacitor 19 connecting the output of operational amplifier 11 to the inverting input of an operational amplifier 20, in whose feedback branch is connected a resistor 21 which together with a resistor 22 sets the gain of amplifier 20. Operational amplifier 20 operates as an A.C. voltage amplifier. The second signal transmission path likewise comprises a coupling capacitor 24 connecting the output of operational amplifier 12 to the inverting input of an operational amplifier 23, whose feedback branch comprises a resistor 25 which together with a resistor 26 sets the gain of amplifier 23; amplifier 23, likewise, operates as an A.C. voltage amplifier.

Both signal transmission paths feed into a first multiplexer 27, comprised of two switching stages 28 and 29. Multiplexer 27 has two outputs connected in common to a highpass filter comprised of an operational amplifier 30, resistors 31, 32 and capacitors 33, 34. Highpass filter 30-34 is designed to suppress interference voltages having frequencies equal to or twice the local mains frequency, in order that the system not be responsive to artificial lighting sources flickering at or at twice the local mains frequency.

High-pass filter 30-34 is connected via a coupling capacitor 35 to an A.C. voltage amplifier comprised of an operational amplifier 36 with gain-establishing resistors 37 and 38.

A second multiplexer 39 comprises two switching stages 40, 41 whose inputs are connected in common to the output of A.C. voltage amplifier 36-38. The outputs of the two switching stages 40, 41 are connected to respective terminals B and C.

A pulse generator 42 is connected to the counting input of a counter 43 operative as a timer for the illustrated circuitry. The output of pulse generator 42 and an output Q4 of counter 43 are connected to respective inputs of an AND-gate 44, whose output is connected to the reset input R of counter 43. An output Q3 of counter 43 is connected to the clock input of a D-flip-flop 45, whose D-input is connected to its own $\overline{Q}$ output.

The Q-output of flip-flop 45 is connected to the control input of the switching stage 28 within first multiplexer 27 and also to left input of an AND-gate 46. The $\overline{Q}$-output of flip-flop 45 is connected to the control input of switching stage 29 of first multiplexer 27 and also to the left input of an AND-gate 47. The right inputs of the two AND-gates 46, 47 are connected in common to the output of an adjustable time-delay stage 48-50, whose time-constant-determining resistor 49 and capacitor 50 are shown externally connected. The input of time-delay stage 48-50 is connected to the output of an AND-gate 51, whose upper input is connected to output Q4 of counter 43, and whose lower input is connected to the output of a time-delay stage comprised of a capacitor 52 and a resistor 53. The output of AND-gate 51 is furthermore connected via a resistor 54 to the base of a transistor 55 whose emitter is connected to the base of a further transistor 56, the collector circuits of the two transistors 55, 56 containing an infrared-emissive transmitter diode 57, operative when subjected to pulsed energization for emitting a pulsed infrared beam from the focussing system towards the subject, for reflection from the subject back onto the photodetector arrangement 9, 10. Numeral 58 denotes the emitter resistor of transistor 56.

The output of AND-gate 46 is connected to the control input of the switching stage 40 within second multiplexer 39, and the output of AND-gate 47 to the control input of switching stage 41.

The power of the infrared energy incident upon photo-detector arrangement 9, 10 is automatically regulated in the illustrated embodiment by automatic adjustment of the level of energization of infrared transmitter diode 57. In particular, the output of A.C. voltage amplifier 36, at which appears a signal whose amplitude is inherently dependent upon the camera-to-subject distance, is connected via a capacitor 59 to the tap of a voltage divider 60, 60' connected across the operating voltage line A. Connected to the tap of voltage divider 60, 60' is a charging diode 61 which charges a capacitor 62 across which is connected a bleedoff resistor 63. Capacitor 62 is connected to the base of a transistor 64 whose collector is connected to operating voltage line A and whose emitter is connected to the base of a further transistor 65. The collector of transistor 65 is connected to the base of transistor 55. Infrared-emissive diode 57 is energized when a "1" signal appears at the output of AND-gate 51, the resistor 54 and the controllable collector-emitter resistance of transistor 65 being connected across the output of AND-gate 51 and acting as a voltage divider whose tap is connected to the base of transistor 55. When the camera-to-subject distance is low, the amplitude of the signal produced at the output of A.C. voltage amplifier 36 is high, capacitor 62 charges to a relatively high voltage, increasing the emitter current of transistor 64, thereby decreasing the collector-emitter resistance of transistor 65, thereby lowering the fraction of the output voltage of AND-gate 51 actually applied to the base of transistor 55, as a result of which the energizing current flowing through infrared-emissive diode 57 tends to decrease. Conversely, if the camera-to-subject distance is long, the energizing current flowing through infrared-emissive diode 57 assumes a higher value. Accordingly, the power level of the signals produced by the photo-detector arrangement 9, 10 is negative-feedback regulated, by automatic control of the level of radiant power emitted by from transmitter diode 57. For longer camera-to-subject distances, higher radiant power is emitted, and for shorter distances lower power. This negative-feedback regulation of the received-back radiant power can be such that the level of radiant power emitted varies inversely to true camera-to-subject distance throughout the entire range of distances in which the focussing system is to be operated; this is implemented by designing the negative-feedback regulating stage such that the collector-emitter resistance of transistor 65 varies within its operative range for the range of photodiode-signal amplitude levels associated with the system's operative range of distances. Alternatively, the negative-feedback regulation can be so designed as to mainly effect a more or less abrupt cut-down or limiting of emitted radiant power for close-up contexts, by designing the regulator such that transistor 65 begins to lower the energization level of transmitting diode 57 only when the signal derived from photodetector arrangement 9, 10 begins to exhibit high values associated with short camera-to-subject distances.

Figure 2:
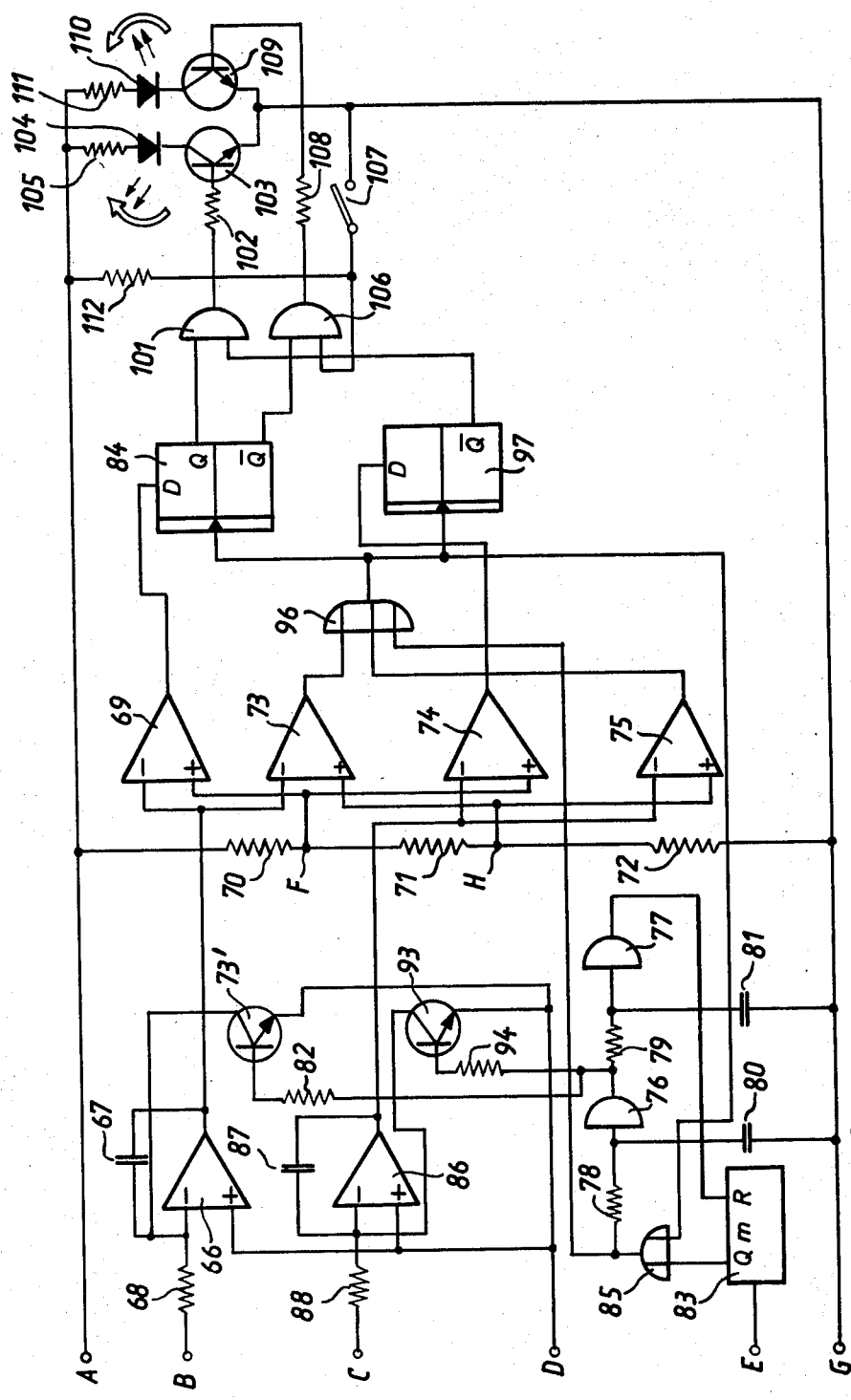

The output of second-multiplexer switching stage 40 is connected via terminal B to a first integrator (see FIG. 2) comprised of an operational amplifier 66 provided with an integrating capacitor 67 in its negative-feedback branch and an input resistor 68. The output of integrator 66-68 is connected to the inverting inputs of two operational-amplifier voltage comparators 69 and 73. The non-inverting input of voltage comparator 69 is connected to the tap F between two resistors 70 and 71 of a voltage divider 70, 71, 72 connected between lines A and G, and having a further tap H between its resistors 71 and 72. The non-inverting input of voltage comparator 73 is connected to tap H. The collector of a transistor 73' is connected to the output of first integrator 66-68 and its emitter to ground line D; when transistor 73' is rendered conductive, it serves to discharge integrating capacitor 67 and thereby reset first integrator 66-68.

The output of voltage comparator 69 is connected to the D-input of a D-flip-flop 84. The output of second voltage comparator 73 is connected to the upper input of an OR-gate 96 whose output is connected to the clock signal input of D-flip-flop 84. The bottom input of OR-gate 96 is connected, via an OR-gate 85, to the output Qm of a cycle counter 83. The output Qm of cycle counter 83 is connected to the reset input R thereof by a time-delay chain comprised of gates 76, 77, resistors 78, 79, and capacitors 80, 81. The output of OR-gate 96 is connected to the right input of OR-gate 85. The base of transistor 73' is connected via a resistor 82 to an intermediate point of the time-delay chain 76-81, namely to the output of gate 76. The counting input of cycle counter 83 is connected via terminal E to the output of adjustable time-delay stage 48-50 of FIG. 1.

The output of switching stage 41 of second multiplexer 39 is connected via a terminal C to a second integrator comprised of an operational amplifier 86, an integrating capacitor 87 and a resistor 88, resistor 88 being connected to the inverting input of the operational amplifier, and the non-inverting input being connected to ground line D. The two integrators 66-88 and 86-88 are preferably as nearly identical as possible. The output of second integrator 86-88 is connected to the inverting inputs of third and fourth operational-amplifier voltage comparators 74 and 75. The non-inverting inputs of voltage comparators 74, 75 are respectively connected to voltage-divider taps F and H. The output of operational amplifier 86 is connected to the collector of a transistor 93 whose emitter is connected to ground line D; when transistor 93 is rendered conductive, this serves to discharge integrating capacitor 87 and thereby reset second integrator 86-88. The base of transistor 93 is connected via a resistor 94 to the output of gate 76 of time-delay chain 76-81.

The output of third voltage comparator 74 is connected to the D-input of a second D-flip-flop 97, whose clock signal input is connected to the output of OR-gate 96. The output of fourth voltage comparator 75 is connected to the middle input of OR-gate 96.

The Q-output of flip-flop 84 is connected to the upper input of an AND-gate 101. The $\overline{Q}$-output of flip-flop 84 is connected to the upper input of an AND-gate 106. The lower input of AND-gate 101 is connected to the $\overline{Q}$-output of flip-flop 97. The lower input of AND-gate 106 is normally connected to the positive operating line A via a resistor 112 but can be connected to the negative operating line G by the closing of a limit switch 107 which closes when the camera's focus adjuster has been brought all the way to maximum-distance or infinity setting. The outputs of AND-gates 101, 106 are connected via respective resistors 102, 108 to the bases of transistors 103, 109. The emitters of transistors 103, 109 are connected in common to negative operating line G, and the collector circuit of each includes a respective LED 104, 110 connected in series with respective current-limiting resistors 105, 111. As indicated by the curved arrows, one or the other of the two LED's 104, 110 lights up to inform the user of the direction in which the camera's subject-distance setting should be manually changed, or is about to be automatically changed, to correct the camera's state of focus. It will be understood that the two transistors 103, 109, instead of controlling an indicator system such as shown, could instead control the direction of operation of a reversible adjusting motor.

The illustrated circuitry operates as follows:

When power-connect switch is closed, a time delay established by time-delay stage 52, 53 elapses before an enabling "1" signal is applied to the lower input of AND-gate 51. This precludes energization of infrared-emissive diode 57, until after the elapse of a warm-up interval sufficient for pulse generator 42 to reach and stabilize at its designed frequency.

After AND-gate 51 has thusly become enabled, it produces an output "1" signal, resulting in energization of transmitter diode 57, once per counting cycle of counter 43. In response to predetermined numbers of pulses received from pulse generator 42, counter 43 produces a "1" signal on its output Q3 and thereafter a "1" signal on its output Q4, in response to which latter the "1" signal is produced at the output of AND-gate 51. After one such cycle of operation counter 43 resets.

During one operating cycle of counter 43, the "1" signal produced at its output Q3 causes a "1" signal to appear at the $\overline{Q}$-output of D-flip-flop 45; during the next operating cycle of counter 43, the "1" signal produced at output Q3 causes such "1" signal to skip over to the Q-output of flip-flop 45; and so forth, proceeding in alternation. As a result, during one cycle of operation of counter 43, first multiplexer switching stage 28 and second-multiplexer switching stage 40 are rendered conductive, for transmission of the signal from infrared-responsive photodiode 9 through the first signal transmission path, including the signal-processing stages 30-38 shared by both signal transmission paths, to the first integrator 66-68. During the next cycle of operation of counter 43, first-multiplexer switching stage 29 and second-multiplexer switching stage 41 are rendered conductive, for transmission of the signal from photodiode 10 through the second signal transmission path, including shared signal-processing stages 30-38, to second integrator 86-88. And so forth, the transmission of the signals from first and second photodiode 9, 10 occurring alternately, during alternate respective cycles of operation of counter 43.

As explained in commonly owned copending application Ser. No. 28,186 filed Apr. 9, 1979, if the camera's present subject-distance setting is exactly correct, the reflected-back infrared radiation incident on photodetector arrangement 9, 10 is incident on both photodiodes 9 and 10 equally; if the present subject-distance setting is shorter than the true subject distance, the reflected-back beam is incident more on or exclusively on one of the two photodiodes 9, 10, depending upon the extent to which the present setting is too short; if the present subject-distance setting is longer than the true subject distance, the reflected-back beam is incident more on or exclusively on the other of the two photodiodes 9, 10, depending upon the extent to which the present setting is too long.

During one cycle of operation, the first integrator 66-68 integrates the processed signal derived from first photodiode 9, along with noise unavoidably present in the signal furnished by the photodiode per se and in the first signal transmission path in general. This integration continues for as long as the first switching stage 40 of second multiplexer 39 remains conductive. Advantageously, switching stage 40 is rendered conductive somewhat after the first switching stage 28 of first multiplexer 27, in order to allow the signal-processing circuitry to fully react to the signal it is to process before transmission by second-multiplexer switching stage 40; and likewise is rendered non-conductive before corresponding first-multiplexer switching stage 28 is rendered non-conductive. Upon termination of this integration, the integral signal thus far developed at the output of first integrator 66-68 is persistently held.

Then, during the next cycle of operation of counter 43, the processed signal from the second photodiode 10 is integrated by second integrator 86-88 and, at the end of this integration, the integral signal developed at the output of second integrator 86-88 is likewise persistently held.

During the next-following cycle of operation of counter 43, the processed signal derived from first photodiode 9 is again applied to first integrator 66-68, and thus integration of the signal derived from first photodiode 9 continues.

And so forth.

In this way, the first and second integral signals developed at the outputs of first and second integrators 66-68 and 86-88 build up stepwise, of course having magnitudes dependent upon the intensity of infrared radiation incident upon their respective photodiodes 9 and 10. Subjecting the processed signals derived from the two photodiodes 9, 10 to integration very considerably improves the signal-to-noise ratio of the signals thusly obtained, i.e., yields light-dependent integral signals which are much more exclusively dependent upon the information of actual interest, and much less dependent upon photodiode and other noise, than are the signals produced at the two outputs of second multiplexer 39.

The integral signal at the output of one or the other or both of the first and second integrators 66-68, 86-88 thus changes stepwise, changing by one step during each alternate operating cycle of counter 43, and the number of integrations performed by the integrator before its output signal reaches the threshold voltage level of its associated voltage comparators 69 and 73 or 74 and 75 will depend upon the amplitude of the processed photodiode signal being integrated.

During the course of a state-of-focus evaluation, the output voltages of the first and second integrators 66-68 and 86-88 will decrease stepwise. The threshold voltage levels of the two comparators 69 and 74 which respectively receive the output signal of the first and second integrators are both determined by the potential at voltage-divider tap F. During the ongoing stepwise integration, the threshold voltage level of one or the other of the two comparators 69, 74 will be reached first, depending upon whether the camera's present subject-distance setting is too short or too long. If the present subject-distance setting is correct, the threshold levels of both comparators 69, 74 will be reached simultaneously, at least in the nominal case.

The threshold voltage levels of the two voltage comparators 73 and 75 are set to lower values than those of the voltage comparators 69, 74. Accordingly, during the stepwise decrease of the first and second integral signals, the one of the two voltage comparators 73, 75 whose threshold level is first reached will have such level reached only after the associated one of the two voltage comparators 69, 74 has had its threshold level reached by the more quickly decreasing one of the two integral signals. The difference between the threshold levels of comparators 69 and 73, and as between comparators 74 and 75, is so selected as to establish a tolerance range of acceptable state-of-focus error.

This will now be described with regard to the following cases:

If the present subject-distance setting is in error in a first direction by more than an acceptable amount, then the first integral signal derived from photodetector 9 and produced by first integrator 66-68 decreases to reach the threshold level of comparator 69, before the second integral signal produced by second integrator 86-88 can reach the threshold level of comparator 74. Accordingly, a "1" signal is applied to the D-input of D-flip-flop 84. Then when the first integral signal continues to decrease and reaches the threshold level of associated comparator 73, the latter, via OR-gate 96, applies a clock signal to the clock signal inputs of both flip-flops 84, 97, the former flip-flop accordingly producing a "1" signal at its Q-output and flip-flop 97 a "1" signal at its $\overline{Q}$-output.

If the distance error is of the same direction as just assumed, but of acceptable magnitude, then here again the threshold level of comparator 69 is reached by the first integral signal before that of comparator 74 is reached by the second integral signal, and a "1" signal is applied to the D-input of flip-flop 84. However, before the first integral signal can additionally reach the threshold level of its further comparator 73, the second integral signal reaches the threshold level of comparator 74, and a "1" signal is applied to the D-input of flip-flop 97 as well. Thereafter, the first integral signal does reach the threshold level of comparator 73, and via OR-gate 96 clock signals are applied to the clock signal inputs of both flip-flops 84, 97, with the result that the former registers a "1" signal at its Q-output and the latter registers a "0" signal at its $\overline{Q}$-output.

If the subject-distance setting is exactly correct, the two comparators 69, 74 are tripped simultaneously, and thereafter the two comparators 73, 75 are tripped simultaneously, and the signals registered by the flip-flops 84, 97 are the same as in the case mentioned just previously.

If the distance-setting error is of the opposite direction, but again of acceptable magnitude, the second integral signal will reach the threshold level of comparator 74, then the first integral signal will reach the threshold level of comparator 69, and then the second integral signal will reach the threshold level of comparator 75, and the signals registered by flip-flops 84, 97 will be the same as in the case of an exactly correct subject-distance setting.

If the distance-setting error is of the same polarity as assumed just above, but of more than acceptable magnitude, the second integral signal reaches the threshold levels of comparators 74 and then 75 before the first integral signal can even reach the threshold level of comparator 69. As a result, flip-flop 84 registers a "0" signal at its Q-output, and flip-flop 97 registers a "0" signal at its $\overline{Q}$-output.

Irrespective of which these cases arise, when a signal appears at the output of Or-gate 96 to clock both flip-flops 84, 97, this output signal is additionally applied to the right input of OR-gate 85. The output signal of the latter, delayed in time by time-delay chain 76-81, renders transistors 73', 93 conductive to reset the integrators 66-68, 86-88, and is furthermore applied to the reset input R of cycle counter 83, resetting the latter. Cycle counter 83 is used to establish the maximum amount of time between successive clockings of flip-flops 84, 97. In the event that neither of the two voltage comparators 73, 75 has effected the clocking of flip-flops 84, 97 by the time that output Qm of cycle counter 83 produces an output signal, then such output signal is transmitted via OR-gate 85 and OR-gate 96 to the clock inputs of the two flip-flops. On the other hand, if, in a time shorter than the alloted time, one of comparators 73, 75 has effected clocking, then clocking simultaneously serves to shorten the counting cycle performed by counter 83, i.e., so that a new counting cycle be initiated.

If, upon clocking, the signals applied to the D-inputs of flip-flops 84, 97 are respectively a "0" and a "1", then only AND-gate 106 produces an output "1" signal, and LED 110 lights up.

If, upon clocking, the signals applied to the D-inputs of flip-flops 84, 97 are both "1" signals, then neither of AND-gates 101, 106 produces an output "1" signal, and neither one of LED's 105, 110 lights up.

If, upon clocking, the signals applied to the D-inputs of flip-flops 84, 97 are respectively a "1" and a "0", then only AND-gate 101 produces an output "1" signal, and only LED 105 lights up.

It is assumed that LED 110 lights up to indicate that the camera's present subject-distance setting should be changed to a longer value. If the user does this and furthermore adjusts all the way to the maximum available subject-distance setting, switch 107 closes, to disable AND-gate 106 and therebycause LED 110 to go dark. This causes the indicator system to indicate a state of correct focus. Although the system is not actually in an equilibrium state, the user is at least not continually instructed to turn the camera's focus adjuster ring farther than it can go.

It will be understood that each of the elements described above, or two or more together, may also find a useful application in other types of circuit configurations differing from the types described above.

While the invention has been illustrated and described as embodied in a focussing system which generates a display instead of activating an automatic adjusting motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a focussing system of the type comprised of first and second photodetector means operative for generating respective first and second photodetector signals whose relationship depends upon state of focus, in combination, integrating means receiving the first and second photodetector signals and developing therefrom first and second integral signals, first signal storing means having a data signal input and a clock signal input, second signal storing means having a data signal input and a clock signal input, and threshold circuit means having outputs connected to the data signal and clock signal inputs of the first and second signal storing means and having inputs connected to receive the first and second integral signals, operative when either of the first and the second integral signal reaches a predetermined value for applying a data signal to the data signal input of the first or of the second signal storing means, respectively, and operative when either of the first and the second integral signal reaches a predetermined value beyond the first-mentioned predetermined value for applying a clock signal to the clock signal inputs of both the first and the second signal storing means.

2. A focussing system as defined in claim 1, the threshold circuit means comprising first and second threshold detector circuits respectively connected to receive the first and the second integral signals and generating an output signal when the respective integral signal reaches the respective first-mentioned value, third and fourth threshold detector circuits respectively connected to receive the first and the second integral signals and generating an output signal when the respective integral signal reaches the respective second-mentioned predetermined value, and an OR-gate having inputs connected to receive the output signals of the third and fourth threshold detector circuits and having an output connected to the clock signal inputs of the first and second signal storing means.

3. A focussing system as defined in claim 2, the integrating means comprising first and second integrator circuits both having the same circuit configuration and respectively receiving and integrating the first and second photodetector signals, each integrator circuit including an active element and a respective integrator capacitor, the first, second, third and fourth threshold detector circuits being voltage comparators having inputs connected to the outputs of the first and second integrator circuits.

4. A focussing system as defined in claim 1, furthermore including cycle timing means operative after the integrating means has integrated the first and second photodetector signals for a predetermined length of time for applying a clock signal to the clock signal inputs of the first and second signal storing means, whereby in the event that neither the first nor the second integral signal reaches a value clocking the signal storing means the latter will nevertheless be clocked by the cycle timing means.

5. A focussing system as defined in claim 4, the cycle timing means being operative for implementing a timing operation establishing said predetermined length of time, the threshold circuit means furthermore including means operative when a clock signal is applied to the clock signal inputs of the first and second signal storing means for also shortening the timing operation performed by the cycle timing means.

6. A focussing system as defined in claim 5, the cycle timing means comprising a pulse generator and a digital counter counting pulses produced by the pulse generator, the digital counter having a reset input, the means shortening the timing operation performed by the cycle timing means comprising means applying a reset signal to the reset input of the digital counter when a clock signal is applied to the clock signal inputs of the first and second signal storing means.

7. A focussing system as defined in claim 4, the integrating means comprising first and second integrators respectively receiving and integrating the first and second photodetector signals, each of the first and second integrators including a respective integrating capacitor, the timing means including semiconductor discharge switch means connected to the integrating capacitors and operative for discharging them.

8. A focussing system as defined in claim 7, the cycle timing means comprising a pulse generator and a digital counter counting the pulses produced by the pulse generator, the counter having an output at which a signal is produced when a predetermined count is reached and the counter also having a reset input, a first gate having an input connected to the output of the counter and having an output connected to the semiconductor discharge switch means for controlling the latter, furthermore including time-delay means connected between the output of the first gate and the reset input of the counter, and furthermore including a second gate having an output connected to the clock signal inputs of the first and second signal storing means and additionally connected to an input of the first gate, the output of the first gate being additionally connected to an input of the second gate, the threshold circuit means furthermore including first, second, third, and fourth comparators, the first and third of which respectively receive the first and second integral signals and have outputs connected to the data signal inputs of respective ones of the first and second signal storing means, the second and fourth comparators having inputs connected to receive the first and second integral signals and having outputs, the second gate having inputs connected to the outputs of the second and fourth comparators.

9. A focussing system as defined in claim 1, the integrating means comprising first integrating means receiving the first photodetector signals and developing therefrom the first integral signal and second integrating means receiving the second photodetector signals and developing therefrom the second integral signal, the focussing system including means causing the first and second photodetector signals to be pulsed signals and means operative for causing the first and second integrating means to integrate the pulsed first and second photodetector signals intermittently with the intermittent integrations starting subsequent to the starts of the pulses of the first and second photodetector signals.

10. A focussing system as defined in claim 1, the focussing system being of the type emitting radiation towards a subject with the first and second photodetector means receiving light reflected from the subject, furthermore including means operative for decreasing the power of the emitted radiation with increasing subject distance by automatically changing the power of the emitted radiation in dependence upon the power of the first and second photodetector signals, whereby to reduce the dependence upon mere subject distance of the time intervals required for the first and second integral signals to reach said predetermined values.

11. A focussing system as defined in claim 1, the first and second signal storing means each comprising a clocked flip-flop.

12. A focussing system as defined in claim 11, each clocked flip-flop being a D flip-flop.

* * * * *